United States Patent [19]
Mockry

[11] Patent Number: 5,811,035
[45] Date of Patent: Sep. 22, 1998

[54] MULTIPLE PURPOSE PANEL FOR COOLING TOWERS

[75] Inventor: Eldon F. Mockry, Lenexa, Kans.

[73] Assignee: The Marley Cooling Tower Company, Overland Park, Kans.

[21] Appl. No.: 706,255

[22] Filed: Sep. 4, 1996

Related U.S. Application Data

[63] Continuation-in-part of Ser. No. 705,736, Aug. 30, 1996, abandoned, which is a continuation-in-part of Ser. No. 470,762, Jun. 6, 1995, abandoned.

[51] Int. Cl.$^6$ .................................................. B01F 3/04
[52] U.S. Cl. .......................... 261/111; 52/578; 52/588.1; 261/DIG. 11
[58] Field of Search ............................. 261/111, DIG. 11; 52/578, 588.1

[56] References Cited

U.S. PATENT DOCUMENTS

| | | | |
|---|---|---|---|
| 3,100,556 | 8/1963 | De Ridder | 52/588.1 |
| 3,216,165 | 11/1965 | Shaver | 82/578 |
| 3,555,762 | 1/1971 | Constanzo, Jr. | 72/588.1 |
| 4,125,340 | 11/1978 | Klaus et al. | 52/588.1 |
| 4,266,381 | 5/1981 | Deller | 52/578 |
| 4,283,897 | 8/1981 | Thompson | 52/588.1 |
| 4,788,013 | 11/1988 | Kinnet, Jr. et al. . | |
| 5,028,357 | 7/1991 | Bardo . | |
| 5,204,149 | 4/1993 | Phenicie et al. | 52/588.1 |
| 5,236,625 | 8/1993 | Bardo et al. . | |
| 5,411,782 | 5/1995 | Jarvis et al. | 52/578 |

OTHER PUBLICATIONS

Morrison Molded Fiberglass Company, Bristol, VA; EXTREN Fiberglass Structural Shapes Design Manual, Copyright 1989; p. I–1 1989; p. I–3 Nov. 1990; p. I–8 Jun. 1993.

Bedford Reinforced Plastic, Inc., Specification Sheet; Date Unknown received by applicant summer 1994.

The Marley Cooling Tower class F400 brochure, copyright 1993.

Creative Pultrusion Design Guide; Creative Pultrusion, Inc., Alum Bank, PA: vol. 2, Rev 1 undated.

*Primary Examiner*—Tim R. Miles
*Attorney, Agent, or Firm*—Hovey,Williams, Timmons & Collins

[57] ABSTRACT

A pultrudable, fiber reinforced synthetic resin multiple purpose panel for cooling towers is provided of construction such that when a series of the panels are mounted in side-by-side relationship on supporting structure of the tower, they may be used to form either a deck or wall of the tower. Each of the panels has an elongated main panel section, and two longitudinally extending end sections which project from the main panel section in the same direction. A flange extending outwardly from the outer margin of one of the end sections is adapted to receive a series of self-tapping fasteners for securing each of the panel sections to the tower supporting structure. Means is provided on the panel sections for effecting an interlock between adjacent side-by-side panels to prevent movement between proximal end sections of the panel in a direction transverse to the longitudinal axes of the panels to thereby maintain adjacent main panel sections in generally parallel relationship when loads are imposed on the outer surfaces of the panels in a direction essentially normal thereto.

16 Claims, 4 Drawing Sheets

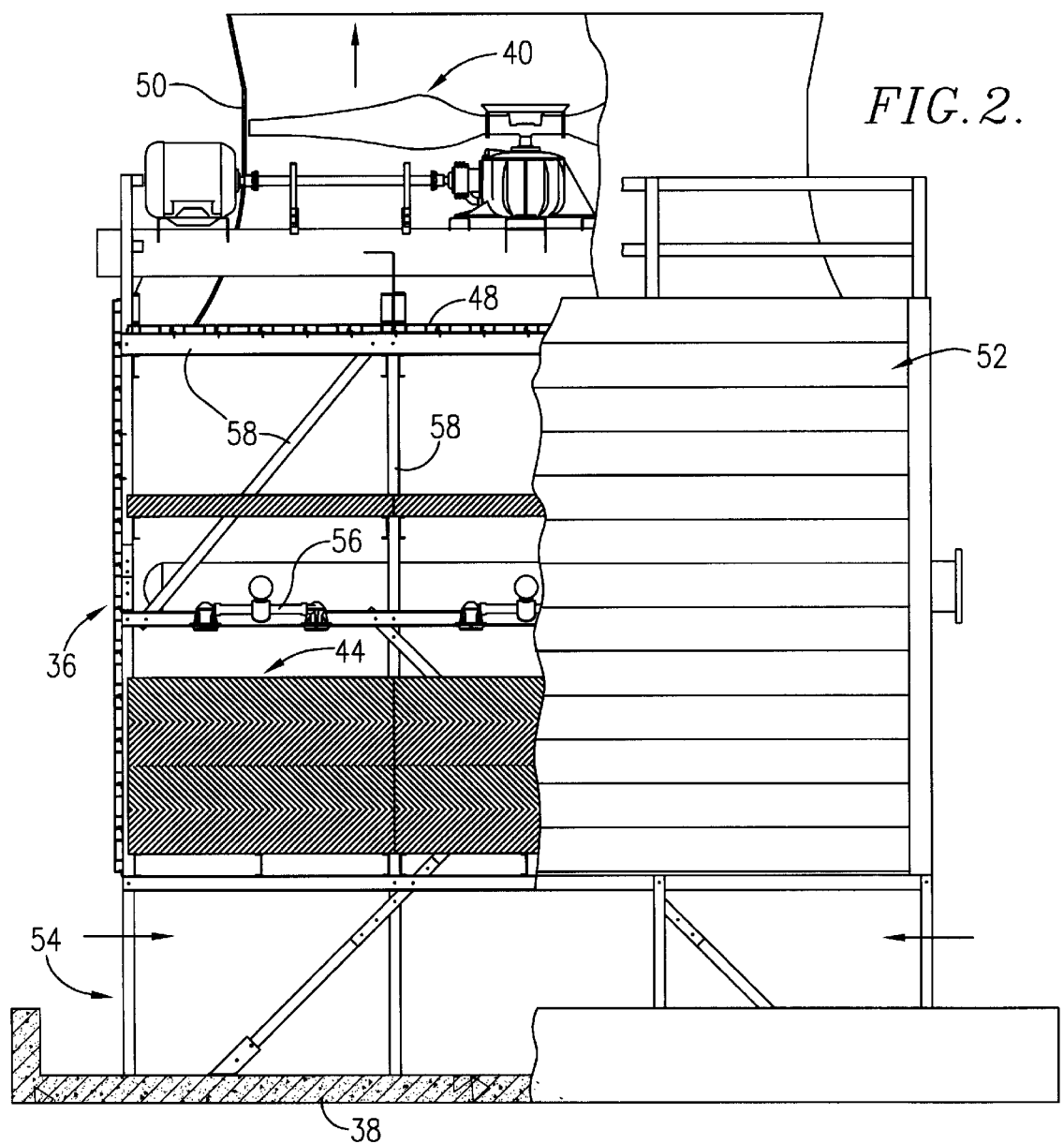
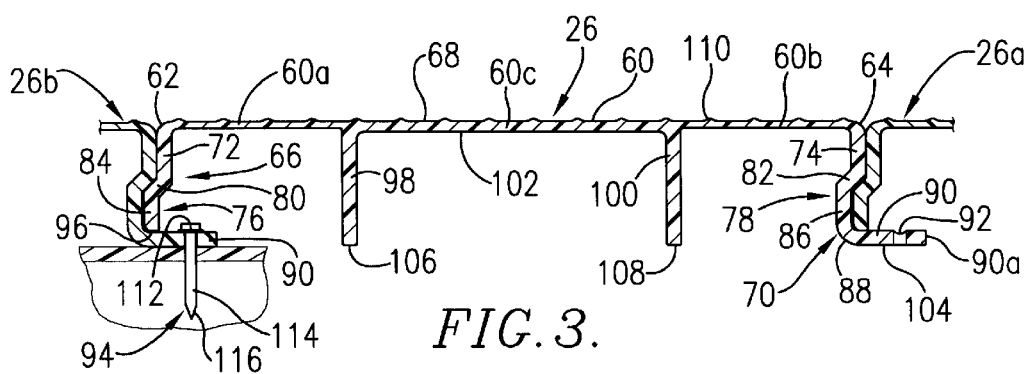
FIG. 2.
FIG. 3.

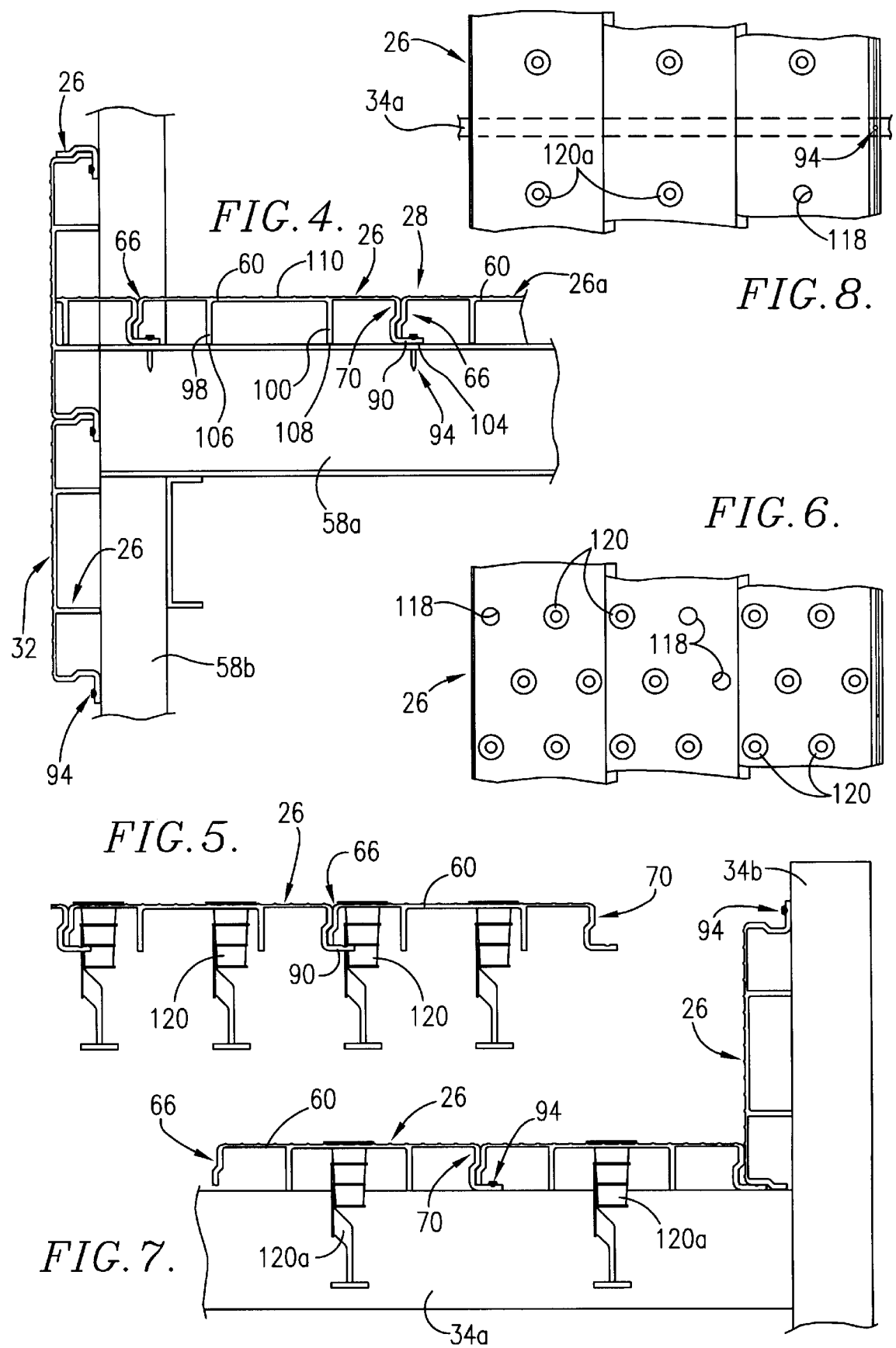

MULTIPLE PURPOSE PANEL FOR COOLING TOWERS

RELATED APPLICATION

This application is a continuation-in-part of U.S. application Ser. No. 08/705,736, filed Aug. 30, 1996, now abandoned, and entitled MULTIPLE PURPOSE PANEL FOR COOLING TOWERS, which is a continuation-in-part of U.S. application Ser. No. 08/470,762, filed Jun. 6, 1995, now abandoned, and entitled MULTIPLE PURPOSE PANEL FOR COOLING TOWERS.

BACKGROUND OF THE INVENTION

1. Field of the Invention

This invention relates generally to industrial water cooling towers and particularly to a pultrudable, fiber reinforced synthetic resin multiple purpose panel for cooling towers of construction such that when a series of the panels are mounted in side-by-side relationship on supporting structure of the tower, they may be used to form either a deck or wall of the tower. Means is provided on the panels for effecting an interlock between adjacent panels for preventing relative movement of interengaging panels when loads are imposed on the outer surfaces thereof in a direction essentially normal thereto.

2. Description of the Prior Art a. Generally.

The use of fiber reinforced synthetic resin materials in the construction of industrial size water cooling towers has evolved over the years. Fiberglass components such as fan stacks, fan blades, fill support grids, and wood tower braced frame diagonal connectors have been successfully used for many years in towers of this type,. proving that fiberglass reinforced resins are sufficiently durable to be used in a wide variety of cooling tower applications where a moist, corrosive environment exists. In more recent years, smaller cooling towers used primarily in HVAC and small process applications have been designed using glass fiber reinforced synthetic resins as the primary construction material, not only for air water contact internal components as well as major structural elements, but also the entire water distribution and collection components. An exemplary tower of this type is disclosed in the assignee's U.S. Pat. No. 4,788,013 entitled Four-Way Cross Flow Water Cooling Tower. Towers of this type necessitate that customers be charged a premium price because of the economics of using glass fiber reinforced synthetic resin material as the major construction material. However, greater longevity of the tower attributable to superior corrosion resistance of the synthetic resin materials offers a long term overall economic benefit to the user in terms of decreased maintenance and replacement costs.

The relatively high cost of glass fiber reinforced synthetic resin materials as compared with conventional cooling tower construction materials such as wood or galvanized metals requires that fiber reinforced resin towers be designed with particular care to efficiency, while remaining within the structural and load limitations of glass fiber resin materials. In most instances, a spray lay up process for manufacturing glass fiber reinforced resin parts is utilized because of the need to produce components of a particular configuration and of specific strength characteristics.

For example, in the '013 patent, the top is formed as a laid up component defining the hot water distribution basin, plenum cover, and fan shroud while structurally functioning to carry the loads imposed on it directly to the main support columns.

Interest is increasing in the use of fiber reinforced synthetic resin materials for the components of larger industrial sized water cooling towers as a substitute for conventional wooden structures. Again, the primary reason for this interest is durability and longevity of the structure in the corrosive and wet environments which cooling towers must operate. A secondary motive is developing concern over leaching of wood treatment chemicals and the effect of that leaching on the environment in specific applications. Douglas fir has long been used in the construction of cooling towers because of its superior longevity under wet corrosive conditions, and relatively low costs. The price differential however between wood fir components and fiber reinforced synthetic resin elements used in construction of an industrial sized water cooling tower may be as much as three to five times greater for the synthetic resin materials.

Large industrial sized water cooling towers necessarily have more load bearing requirements because of the taller height columns and larger spans, than is the case with smaller unitary towers as for example illustrated and described in the referenced '013 patent. As towers get larger, the advantage of combining form and function as was accomplished in the tower of the '013 patent diminishes. Shipping and handling limitations constrain the maximum size of parts. More, not just bigger parts, are required. These parts generally become simpler and less complicated parts.

Pultrusion processes offer significant economic advantages in the manufacture of glass fiber reinforced synthetic resin parts, as compared with hand lay up processes, but the very nature of the pultrusion requires that the parts be of uniform cross sectional configuration. For economy of manufacture, a large volume of a particular cross section part is desirable. The pultrusion process is therefor generally more economical than spray lay up manufacturing for large volumes of parts of constant cross section. Furthermore, pultrusion of parts allows continuous glass fiber reinforcement to be incorporated in the resin in a wide variety of selected patterns for desired load bearing properties. As a consequence, the larger volume and simpler parts required for large industrial cooling towers makes the pultrusion process economically attractive as a means of constructing such parts.

Large mechanical induced draft industrial sized water cooling towers typically have large exterior generally flat surfaces which serve to house or enclose the cooling tower internal components. A horizontal fan deck is also provided across the top of the tower. In addition to serving as an upper enclosure for tower internal components, the horizontal fan deck is typically used as a walking and working surface to provide worker access to mechanical equipment within the tower. Fan decks may be as large as 60 feet by 60 feet per cooling tower cell with a large circular fan opening in the center of the deck. The fan opening may be as large as 37 feet in diameter or more.

Cross flow cooling towers additionally have generally flat horizontal hot water distribution basins located directly above the fill. The hot water basins must support the water contained in the basin as well as distribution components and worker maintenance activities. These basins may be as large as 20 feet by 40 feet per cell in the case of splash fill towers.

Industrial sized water cooling towers have vertical surfaces which are cased from the outside to prevent air from entering the tower except for the air inlet openings of the structure. Counterflow towers have external casing walls which extend from the upper fan deck down to the bottom of the fill structure. These casing walls may be as much as 24 feet or more high. In some instances, a counterflow tower may have one or more faces which are completely cased from the cold water basin to the overlying top wall and fan structure. Air is not permitted to enter into the tower through these faces the entire height of the tower. Cross flow towers typically have two end walls which are completely cased. These walls may be as large as 80 feet wide and 50 feet high.

Interior walls are also used to partition water cooling tower cells from one another. This permits the isolated and independent operation of individual cooling cells. Cell partitions in the plenum of the tower are absolutely necessary to prevent air from entering the cell from an adjacent non-operating fan opening. Cell partitions often extend from the fan deck down to the cold water collection basin. Large industrial counterflow towers also typically employ vertical walls in the falling water zone under the fill to prevent wind from carrying water out of the tower. These wind walls extend from the bottom of the fill to the cold water collection basin. On typical towers which have open sides and ends for air to enter, the wind walls in plan view extend from each of the four corners of a respective tower inward to the center of the tower at approximately a 45° angle from the longitudinal face and then continue along the longitudinal center line of the tower between the four corner walls. On counterflow towers with cased end walls, the wind wall extends from end to end along the longitudinal center line of the tower.

b. Prior Materials and Practices.

i. Wood.

Large industrial cooling towers have traditionally been constructed from wood. Flat surface applications involving decks and casing have typically employed plywood or tongue and groove boards. Attachment has usually been with nails although certain applications have used screws or bolts. Nail heads are driven down to the surface of the wood and therefore in the case of decks, for the most part have not created a tripping hazard. Bolt heads, and to a lesser extent screw heads, may present more of a hazard for tripping. Wood permits counter bore recessing of bolt heads below the outer surface of the panel if cost considerations justify that added practice.

ii. Glass Fiber Reinforced Synthetic Resin Lay Up Panels

Fan decks have been covered with 3 foot by 6 foot glass fiber reinforced synthetic resin lay up panels which have three integrally molded hollow ribs on the bottom surface that span the panel in the long direction. These panels employ a textured surface to create a slip resistant walking surface. Self-drilling, self-tapping, hex head screws are used to attach the panels to glass fiber reinforced synthetic resin pultruded framing members. The screw hex heads are about $3/16$ inch high and are placed between textured nubs which are about $1/16$ inch high. This leaves the heads exposed $1/8$ inch above the nubs. The glass fiber reinforced synthetic resin panels are nominally $1/4$ inch thick at the attachment points which render impractical counter sinking of the hex heads. The hex heads present a possible impediment to rolling of maintenance equipment across the fan deck.

The glass fiber reinforced synthetic resin lay up panels are heavy, weighing as much as 70 pounds for a 3' by 6' panel. They are difficult to manufacture and are relatively expensive. Installation is relatively simple but tedious in practice. If care is not exercised in orienting the panels square to the framing, then the seam created by butting adjacent panels together result in a sawtooth appearance with gaps along the length of the adjacent edges of the panels. Although functionally adequate, the seams present a poor appearance, even if caulked.

Adjacent panels do not interlock along adjacent edges. Differential deflections are experienced when a load is transferred from one panel to another at mid-span. Difficulties are encountered in rolling the small wheels of maintenance equipment over these discontinuities.

iii. Foam Core Tongue and Groove Panels 1 inch by 12 inch foam core tongue and groove panels have been used for cooling tower fan decks. These building panels, available from Morrison Molded Fiber Glass (MMFG) and sold under the trademark DURASHIELD, are constructed by pultruding a synthetic resin skin over a polyurethane foam core and have been used for fan decks. A slip resistant grit surface is sometimes applied to the top surface of the panel as a secondary operation. Although the foam provided insulation, it was not necessary for cooling tower applications. The synthetic resin skins over the foam core are only $1/16$ inch thick and rely on being bonded to the underlying foam to prevent buckling of the panel when the top or bottom skin is in compression as a result of bending.

Fabrication cuts which expose the foam must be sealed to prevent weathering of the foam. Integrity of the foam is paramount to structural load capacity of the panel. Although the panels have been used for cooling tower enclosure decks, their use is not desirable for water distribution decks of cross flow towers because of the multiplicity of holes required in the panels to accommodate respective water distribution nozzles. Providing an effective seal around each nozzle is an impractical process.

Not only are these panels relatively difficult to pultrude and very expensive, they can not span the typical distance between frames. Mid-bay supports are required thus increasing the total price of installation.

iv. Balsa Core Panels

These panels are very similar to the foam core panels described above except that the foam is replaced with end grain cut balsa wood. Use of this type of panel is disclosed by Bardo et al., in U.S. Pat. No. 5,236,625. These panels are even more expensive than the foam core panels referred to above and suffer from the defect that untreated balsa wood is subject to rot in a cooling tower.

v. Rectangular Tubes With Internal Webs

Creative Pultrusions, Inc., Alum Bank, Pa., manufactures several rectangular tubes of synthetic resin material with internal webs that may have some application for flat surface use. These products are sold under the trademark PULTEX and designated as fiberglass reinforced plastic (FRP tubes). However, the tubes are not interlocking and would deflect in the same manner as previously described with respect to the glass fiber reinforced synthetic resin lay up panels.

vi. Bedford Deckboard

Bedford Reinforced Plastics, Inc., Bedford, Pa., supplies a product identified as 12 inch Interlocking Deckboard. This pultruded glass fiber reinforced synthetic resin product has a height of about $2\frac{1}{8}$ inches. The Bedford Deckboard is simpler and easier to pultrude than the foam/balsa core panels. In cross section, the panel has a horizontal top member and four vertical webs. Two of these webs are located at the outside edges of the 12 inch wide panel. One of the outside webs is of J-shaped configuration. The other outside web is of a width such that it fits into the J-web of an adjacent panel.

When applied as decking in a horizontal plane, the J-web interlock of the Bedford Deckboard is not effective in transferring a vertical or gravity load from the J-web to the short end web of an adjacent panel. This ability to transfer load from one adjacent panel to another is especially important for load sharing between adjacent panels. Because the deflections of adjacent panels are not forced to be essentially the same, difficulty is experienced in pushing wheeled maintenance equipment over the joints between panels. The J-web deflects downwardly but does not engage the associated short web of an adjacent panel to share the vertical load.

The Bedford 12 inch interlocking deckboard also fails to provide an easy and effective method of attachment of the panels to supporting frame members. Most installers prefer to attach panels by use of fasteners which may be installed from above the deck or outside of the casing of a tower. Self-drilling, self-tapping screws are preferred fasteners because of the labor savings realized in avoiding prefabrication of holes for conventional screws or bolts. In the case of the Bedford Deckboard, the fasteners must necessarily be at least 3 inches long because of the 2⅛ inch depth of the deckboard panel, the ¼ inch thick framing member flange and the drill point length of about ½ inch. This extended screw length requirement makes installation of the deckboard panels very difficult. Preferably, the screws are located close to one of the webs so as to minimize bending of the flange between webs. The flanges can be damaged if a screw is drawn down too tightly in the middle of the flange between the webs. A slip resistant grit surface is sometimes applied to the top surface of the panel as a secondary process. Finally, the Bedford Deckboard is a relatively expensive product for industrial cooling tower applications where the competitive material is primarily wood.

Therefore, there is substantial need in the industrial cooling tower field for a simple, fiber reinforced synthetic resin universal panel which can be applied and used in all of the above described flat surface applications.

The snap action panel of U.S. Pat. No. 4,283,897 is representative of sheet metal panel construction that is used most often as facings for building walls. The modulus of elasticity of rolled, sheet-stock carbon steel, $E_S$, is typically 29,000,000 psi. In comparison, fiberglass pultrusions are of an orthotopic material construction in which the material is stronger and stiffer in the lengthwise direction, the direction in which the material is pulled through the dye, than the crosswise direction. A typical design modulus of elasticity in the lengthwise direction, $E_{LW}$, is 2,200,000 psi including environmental exposure effects. In the crosswise direction, a typical modulus of elasticity, $E_{CW}$, would be 800,000 psi.

When comparing steel to fiberglass pultrusions, steel is found to be 29,000,000/2,200,000=13.2 times stiffer than fiberglass in the lengthwise direction and 29,000,000/800,000=36.2 times stiffer in the crosswise direction. For steel and pultruded fiberglass panels with identical cross-sections subjected to the same loading, the fiberglass panel would deflect 13.2 times that of the steel panel in the lengthwise direction and 36.2 times in the crosswise direction.

The Thompson reference teaches that the interlock (U-shaped tongue 18 and U-shaped socket 21) is ineffective when subjected to heavy leeward winds which cause the panels to buckle or deflect outward and the unfastened edge to pop out of position. For an equivalent pultruded panel, this deflection occurs by bending the panel in the weaker crosswise direction. In light of the teaching of the Thompson reference, the fiberglass pultrusion practitioner would likely conclude that the snap action panel disclosed in the Thompson reference would be unsuitable for fiberglass construction due to the flexible behavior of the panel which would be exacerbated by the flexible behavior of fiberglass, especially in the crosswise direction.

In addition, the snap action wall panel of the Thompson reference is not of sufficient construction to carry significant concentrated loads normal to the panel such as seen on cooling towers. The construction is necessarily light in order to effect the so called snap action. The snap action relies on elastic deflections of flange 18A and/or tab 51 which deflect under the load of forcing the panels together but recovers that deflection and returns to the undeflected position after the interference of flange 18A and tab 51 is relieved. To stiffen the panel by adding significant thickness to carry significant concentrated loads would necessarily increase bending stresses as the panels are snapped into position. Yielding of the material is likely to occur for this stress increase resulting in permanent deformation which defeats the snap action. One skilled in the art would conclude that the snap action panel interlock is necessarily for light construction and not applicable to heavy load carrying construction such as that required for cooling tower fan decks.

The structural assembly of U.S. Pat. No. 5,236,625 comprises all panels of box configuration permitting their use as load-bearing structural walls. However, the '625 patent box panels are expensive to manufacture, difficult to install, and are for different structural applications than the synthetic resin multiple purpose panels of this invention.

The nailable metal floor structure for railway cars disclosed in U.S. Pat. No. 3,216,165 comprise transversely U-shaped members which are designed to be welded together for an integral floor. Because of the rough duty given this flooring, it necessarily must be of extremely rugged construction. The metal planks of the '165 patent again would not be suitable for use in fabrication of decks or exterior walls of cooling towers and similar applications.

SUMMARY OF THE INVENTION

The present invention offers a cost competitive pultrudable, fiber reinforced synthetic resin multiple purpose panel for cooling towers. A single panel may be used either as a horizontal deck member, a water distribution deck panel, or as a casing panel. In all instances, installation of the panels may be accomplished from above in the case of deck use, or from outside of the tower when the panels are used to form a casing.

The panels are provided with integral structure providing an interlock between adjacent panels to load share normal (perpendicular) loads regardless of direction or orientation of the load with respect to the interlock. This interlock is especially important in connection with use of the panels for walking/working surfaces. Not only are loads shared, but differential movement between adjacent panels is minimized thus providing an improved roll surface for wheeled maintenance equipment moved across the horizontal panel surface. A potential tripping hazard is also eliminated.

The improved pultrudable panel also incorporates a novel attachment flange which allows installation of the panels from above or outside of the tower using self-drilling, self-tapping fasteners. The attachment flange for each panel extends outwardly from one end wall section of the panel in spaced relationship from the main wall section of the panel. Therefore, load resistance in the plane of the panels is resisted by direct shear on the fastener which occurs in close proximity to the supporting structure for the panel.

The present improved pultrudable, fiber reinforced synthetic resin multiple purpose panels for cooling towers also offer the advantage of permitting openings to be formed therein for receipt of water distribution nozzles in preferred uniform or staggered patterns of 6 inches by 6 inches, or 1 foot by 1 foot.

The panels also have small ribs which project from the upper surface of the main panel section to increase the slip resistance of the surface by preventing a workmen's shoes from direct contact with the main area of the panel section surface. The ribs function to elevate shoe soles off of the flat surface of the panel thus minimizing the contact area of the worker's feet with the panel surface which creates high contact stress to squeeze moisture off of the ribs.

BRIEF DESCRIPTION OF THE DRAWINGS

FIG. 2 is a side elevational view of an industrial size counterflow cooling tower with parts being broken away for clarity, and illustrating use of the improved pultrudable fiber reinforced synthetic resin panels hereof as horizontal decking, and vertical casing of the tower;

FIG. 3 is an enlarged fragmentary vertical cross sectional view of the horizontal fan decking shown in FIGS. 1 and 2 of the drawings, with parts being broken away and illustrating the manner of attachment of the improved panels hereof mounted on its structural members of a tower;

FIG. 4 is an enlarged fragmentary view of the upper left hand corner of FIG. 2 and illustrating the multiple purpose panels of this invention mounted on horizontal and vertical support members;

FIG. 5 is an essentially schematic fragmentary cross sectional representation of the distribution deck usage of the multiple purpose panels of this invention and illustrating distribution nozzles arranged in a conventional 6 inches by 6 inches staggered spacing pattern;

FIG. 6 is an essentially schematic fragmentary plan view of the distribution deck panel arrangement of FIG. 5, with certain of the distribution nozzles being removed from the openings therefor;

FIG. 7 is an essentially schematic fragmentary cross sectional representation of the distribution deck usage of the multiple purpose panels of this invention and illustrating distribution nozzles arranged in a conventional 1 foot by 1 foot spacing pattern;

FIG. 8 is an essentially schematic fragmentary plan view of the distribution deck panel arrangement of FIG. 7, with certain of the distribution nozzles being removed from the openings therefor.

DETAILED DESCRIPTION OF THE PREFERRED EMBODIMENTS

Figure 1:
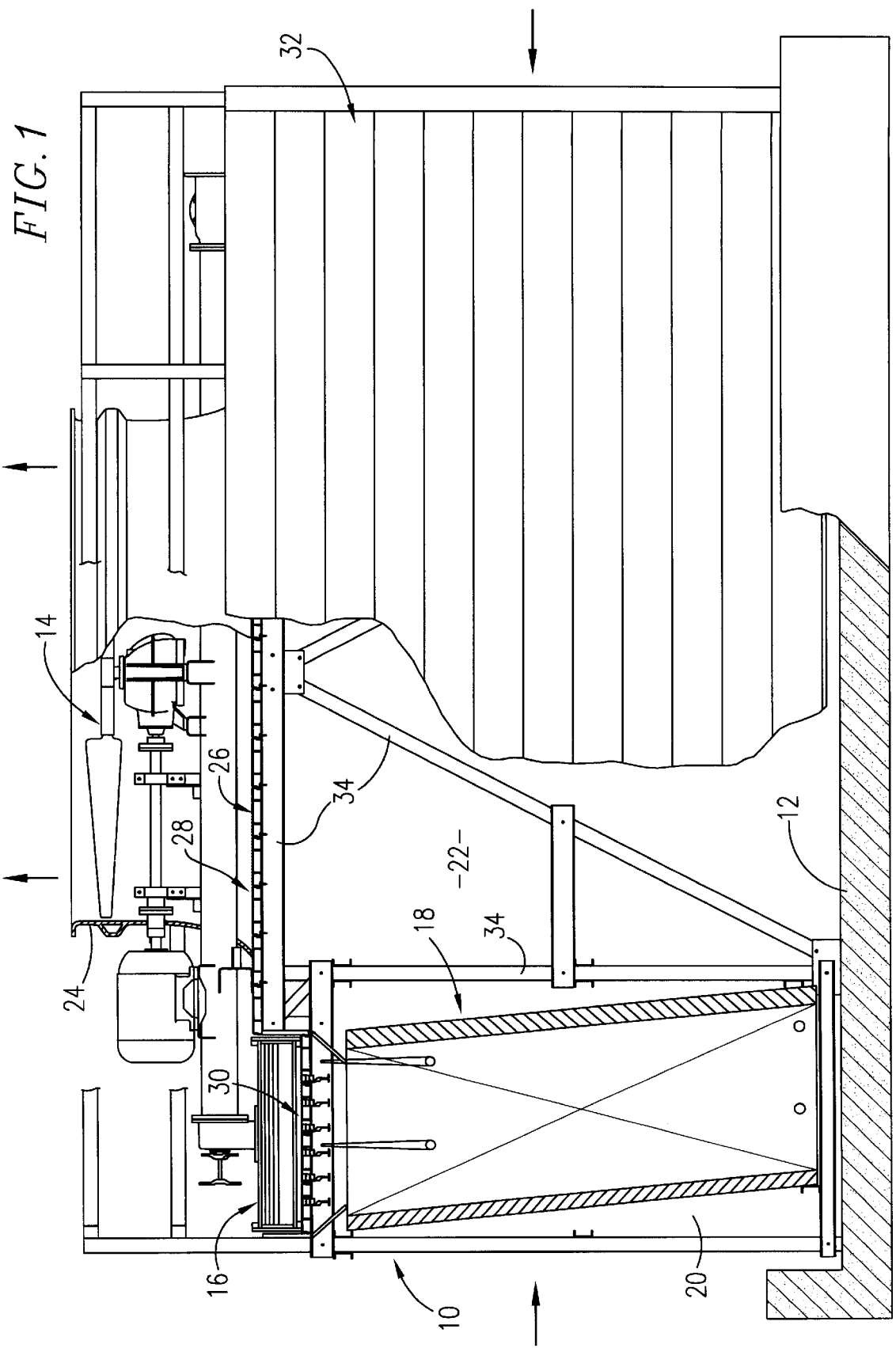
FIG. 1 is a side elevational view of an industrial size cross flow water cooling tower with parts being broken away for clarity, and illustrating the improved pultrudable fiber reinforced synthetic resin panels used to provide horizontal fan decking, hot water distribution decking, and vertical casing of the tower.

A conventional industrial size cross flow water cooling tower 10 is illustrated in FIG. 1 of the drawings and includes a cold water basin 12, an induced draft fan assembly 14, a hot water distributor 16 and fill structure 18 between distributor 16 and basin 12 for bringing hot water gravitating from distributor 16 into cross flow contact with air entering tower 10 through inlet 20 and that flows into the plenum area 22 before being discharged through fan cylinder 24. Pultrudable, fiber reinforced synthetic resin multiple purpose panels 26 are used to form the fan deck 28 surrounding fan cylinder 24, hot water distribution deck 30 of distributor 16 and vertical casing walls 32. Tower 10 has a number of internal structural members 34 which support the components of the tower 10 as well as the deck and wall panels 26. The panels 26 making up decks 28 and 30 and casing walls 32, are all of identical construction.

The counterflow tower 36 illustrated in FIG. 2 has a bottom cold water basin 38 and an upper induced draft fan assembly 40, an internal hot water distributor 56, and fill structure 44 between distributor 56 and basin 38. As illustrated, panels 26 are used to define the horizontal upper deck 48 surrounding the bottom of fan cylinder 50 of fan assembly 40, and also the vertical casing walls 52 of the tower 36. Air enters tower 36 through the lower inlet 54, passes vertically through fill structure 44 and counter current relationship to water gravitating downwardly in the tower from the overlying hot water distributors 56 and vents outwardly through the cylinder 50 of fan assembly 40. Structural members 58 serve as supporting structure for the various internal components of tower 36 as well as deck 48 and casing 52.

Each panel 26 is of uniform cross sectional configuration in order to permit manufacture thereof by a conventional pultrusion process. The panels 26 may be of any desired length but each is typically from about 2 feet to as much as about 40 feet in length. An 18 foot length is preferred for ease of handling. The panel 26 typically is from about 6 inches to about 5 feet in width, but preferably is about 1 foot in width for facilitating handling, assure firm attachment to supporting structures, economical tooling costs and modest off fall.

Referring to FIG. 3, each panel 26 includes an essentially planer main panel section 60 having opposed longitudinally extending generally parallel side margins 62 and 64. An end section 66 integral with margins 62 of main section 60 projects in a direction away from the outer surface 68 of main section 60, while another end section 70 integral with margin 64 of main panel section 60 projects from that main section in the same direction as section 66.

Sections 66 and 70 are non-linear transversely thereof and have inner legs presenting first leg portions 72 and 74 respectively integral with main section 60 and in essentially perpendicular relationship thereto. L-shaped legs 76 and 78 integral with the outer margins of leg portions 72 and 74 of the inner legs of end sections 66 and 70, are defined by intermediate leg portions 80 and 82 respectively which in turn are integral with outer leg portions 84 and 86. Leg portions 84 and 86 are also perpendicular to main panel section 60 and are thereby in parallelism with first leg portions 72 and 74 respectively, and outer leg portions 84 and 86, but offset therefrom in the same direction as a result of angular intermediate portions 80 and 82. The intermediate leg portions 80 and 82 are at an angle of from about 30° to at least slightly less than about 90° with respect to corresponding first and outer portions 72 and 84 in the case of end section 66, and first portion 74 and outer portion 86 of end section 78. By virtue of the fact that the outwardly facing surface of each leg portion 82 is not parallel with the upwardly facing surface of the flange 90 of an adjacent panel 26, interlocking of adjacent panels 26 results in a wedging action between the parts to produce a tight interlock therebetween, even if there are small tolerance errors in the construction of extruded panels 26.

From FIG. 3, it is to be observed that the effective transverse width of each of the end sections 66, i.e., the distance from margin 62 of main panel 60 to outer edge 96 of outer leg portion 84, is such that edge 96 rests on flange 90 of an adjacent panel 26b in side-by-side relationship to panel 26. In like manner, it can be seen from FIG. 3 that end section 66 is configured to complementally fit and rest against end section 78 of an adjacent panel 26b. To this end, a small draft may be provided between adjacent end sections 66 and 70 of adjacent panels 26a and 26b so that the interlock therebetween is tightly engaged as the panels 26a and 26b are pushed together. Furthermore, the end section 66 of each panel 26 rests directly on flange 90 of an adjacent end section 70 in disposition such that end sections 66 serve as load-bearing members which are resistant to transverse deflection or bending and transmit loads thereon in substantially vertical directions through the leg portions 72, 80 and 84 of end section 66.

As is also evident from FIG. 3, for example, the outer leg portions 84 and 86 of end sections 66 and 70 are offset to one side of first leg portions 72 and 74 respectively and displaced in the same direction from main panel section 60 a distance that is approximately equal to the thickness of leg portions 72, 76 and 80 of end section 66, and leg portions 74, 82 and 86 respectively of end section 70. The degree of displacement of outer leg portions 84 and 86 respectively from first leg portions 72 and 74 of respective end sections 66 and 70 is a function of the transverse width of corresponding intermediate leg portions 80 and 82, coupled with the angularity of such intermediate leg portions with respect to the major transverse axes of leg portions 72 and 84 as well as leg portions 74 and 86.

The preferred construction of end sections 66 and 70 is as shown in FIG. 3 wherein the degree of offset of outer end portions 84 and 86 of end sections 66 and 70 is related to and essentially equal to the thickness of the leg portions of the end sections 66 and 70, but it is to be understood that the extent of displacement may be varied up to about three times the thickness of the leg portions of the end sections 66 and 70. Thus, if the thickness of first leg portions 72 and 74 of end sections 66 and 70 is a dimension equal to 1×, then the degree of offset of outer leg portions 84 and 86 of end sections 66 and 70 should be no more than about 3×. The desired degree of offset is designed into the pultrusion tooling for production of panels 26 by appropriate correlation of the angularity and transverse width of intermediate leg portions 80 and 82 of end sections 66 and 70.

Although in the preferred embodiment of panel 26 the thickness of each of the leg portions of end sections 66 and 70 is the same, the relative thickness of the leg portions may be varied if desired for particular applications. The relative thickness of the leg portions of each end section should not vary more than about 2×, i.e., if the thickness of one leg portion is 1×, then the thickness of each of the other leg portions of that end section should not exceed about 2×. The reason for this restriction of relative thicknesses is primarily a matter of pultrusion physics where it is recognized that warpage can occur during cooling of a pultruded part if one portion of the product is significantly thicker than an adjacent portion thereof.

The 3× material thickness (or less) offset is desirable to maintain a stiff interlock. In the panel construction of the Thompson patent referred to above, U.S. Pat. No. 4,283,897, the interlock illustrated in FIG. 3 of that patent is at least 8× material thickness. If the offset is too large, the impositions of loads normal to the plane of the main section of the panel across the interlock will cause the interlock to deflect. As a consequence, the interlock will not be adequately effective.

As a result of bend radii, fabrication tolerances and placement tolerances, 3× material thickness offset is not practical for thin sheet metal panels as in the '897 Thompson patent. The flexible interlock of the Thompson patent explains why the patentee added clips 50 to compensate for outward buckling of the panels as a result of the leeward wind which would otherwise result in interlock disengagement.

Another reason to limit the interlock offset to 3× material thickness is to minimize bending stresses within the interlock portions. When mechanical equipment from fan assembly 40 is removed for service, the deck surface made up of series of side-by-side panels 26 is often planked to distribute the heavy loads imposed on the panels by this equipment and prevent puncture failure of main panel sections 60. Nevertheless, the load must be carried through panels 26 into structural members 58. The load for example is transmitted through end sections 66 and 70 and web sections 98 and 100 at various stages of the equipment removal operation. The larger the offset of the interlock, the greater bending moment in the interlocking leg portions. Bending stress being directly proportional to bending moment, the maximum allowable load that may be carried by the interlock is inversely proportional to the offset. Therefore, the extent of offset should be minimized to maintain maximum load capacity while at the same time be adequate to effect a good interlock.

In the case of a panel 26 of preferred width, i.e., about 1 foot, at least two intermediate support web sections 98 and 100 desirably are integral with the normal underside 102 of main panel section 60 and project away from face 68 thereof in the same direction as end section 66 and 70. The outermost margins 106 and 108 of web sections 98 and 100 are preferably spaced from underside 102 of main panel section 60 a distance slightly greater than the distance of edge 96 from underside 102, but less than or equal to the distance of flat surface 104 of flange 90 from underside 102 of main panel 60. It is preferred that the space between web sections 98 and 100 be larger than the distance from a respective web section 98 to an adjacent end section 66, and the spacing from web section 100 to an adjacent end section 78. However, that spacing may be varied under certain circumstances depending upon the nature of a particular panel 26.

A series of elongated ribs 110 are provided in the upper face 68 of main panel section 60 to increase the slip resistance of the panel 26. The ribs 110 are preferably about 0.2 inch wide and about 0.05 inch high spaced on 0.75 inch centers. These ribs may be of any desired cross sectional configuration, for example transversely rectangular, of configuration where the outer surface is oval or of circular shape, or generally triangular.

When panels 26 are mounted on supporting structure 34 or 58 of towers 10 and 36 respectively, the span between structural supports for panels 26 is usually in the order of about 2 feet to 12 feet with 6 feet being a typical bay spacing. Thus, the number of spans for individual panels 26 will be usually in the range of 1 to 10, with 2 or 3 equally spaced spans being preferred for deflection control.

The depth of panels 26, i.e., the distance from the outer surface 68 of main panel section 60 to a plane through surface 104 through flange 90 is variable, although preferably it is such depth as in the range of about 1 inch to about 5 inches, with 2.12 inches being preferred for panels where a span spacing of 6 feet is utilized, assuming a 60 psf uniform load, 120° F. and moist conditions.

In a preferred panel 26, the outermost spans 60a and 60b of main panel section 60 are both about 0.12 inch thick, while the thickness of central span 60c of main section 60 is about 0.18 inch. The end sections 66 and 78, and the web sections 98 and 100 of panel 26 are preferably of the same thickness, i.e., about 0.25 inch. The attachment flange in this instance should be from about 0.75 inch wide to about 3 inches in width, with a width of about 1.25 inch being preferred.

The interlocking overlap provided between adjacent end sections 66 and 70 of side-by-side panels 26 should be from about 0.125 inch to 1 inch and preferably at least about 0.25 inch. This interlock is the distance horizontally as shown in FIG. 3 from the outermost surface of the outer leg portion 86 of section 78 to the outermost surface of first leg portion 72 of an adjacent panel 26.

The interior web spacing between reinforcement webs 98 and 100 and the spacing of these reinforcement members from respective end sections 66 and 70, may be from about 2 inches to about 8 inches, and in large measure is a function of the width of the main panel 60 and its load carrying requirements. A spacing of about 3.12 inches is desired for 0.12 inch thick panel sections, and about 5.5 inches for 0.18 inch thick panel sections. As is evident from FIGS. 5 and 6, the location of reinforcement web sections 98 and 100 is dictated in large measure by the spacing of water distribution nozzles and when concentrated loads are taken into consideration. Wider reinforcement web section spacing should be accommodated by thicker walls of the sections of panel 26. In the instance of a narrow panel 26, as for example of the order of 6 inches, there may be no need for an interior reinforcement web section 98 or 100.

In the use of panels 26, as depicted for example in FIG. 4, a series of the panels 26 are mounted on a structural member such as 58 in side-by-side relationship. For example, when the panel 26 depicted in FIG. 4 is mounted on the horizontal structural support 58a adjacent upright structural support 58b, a fastener 94 is driven through flange 90 into the underlying support flange of member 58a.

A longitudinal half portion 26c of one of the panels 26 may be used as a means for sealing an air gap that might otherwise exist between a horizontal row of panels 26 and a vertical row of such panels, as depicted in FIG. 4 in connection with counterflow tower 36.

It can also be observed from FIG. 4 that the installer may drive each fastener 94 through flange 90 of panel 26 into the underlying structural support 58a from a position above the panel 26 and thereby the horizontal deck being formed with a plurality of panels 26. Of particular importance is the fact that surface 104 of flange 90 of panel 26 rests in flat engagement with the upper face of the flange of structural member 58a, and that each of the fasteners 94 may be of relatively short length because of the close coupling of flange 90 of panel 26 to underlying structural support 58a.

Again viewing FIG. 4, it can be seen that the outer edges 106 and 108 of panel 26 rest directly on the upper surface of structural member 58a and support main panel section 60 in generally parallel relationship with the top of the associated structural member 58a.

Upon placement of another panel designated 26a in FIG. 4 next to the initial panel 26, the end section 66 of panel 26a interfits with and rests directly against end section 70 of panel 26. The interfitting and mating relationship of such end sections is as depicted in FIG. 3. Thus, the main sections 60 of adjacent side-by-side panels 26 and 26a are in parallel relationship with a close fit being provided between adjacent end sections 66 and 70. Edge 96 of end section 66 of the panel 26a rests directly on and is supported by the upper surface of flange 90 of panel 26. The interlock between end sections 66 and 70 prevents margins 64 and 62 of panels 26 and 26a from moving relatively in a vertical direction across the width of the span between horizontally spaced structural members 58a. This interlock is effective to prevent significant vertical deflection of the margins of adjacent panel sections 60 with respect to one another when workmen walk across the surface of fan deck 28 of the cross flow tower FIG. 1, or the fan deck 48 of counterflow tower 36, or as wheeled equipment is rolled across respective decks.

Upon fastening of panel 26a in the position thereof as illustrated in FIG. 4 using a series of fasteners 94, another panel 26 may then be placed in position and affixed with suitable fasteners. This process is continued until the deck 48 is complete. It is noteworthy in this respect that the individual panels 26 may readily be field cut to any desired length and end shape configuration to define decks 28 or 48 of cooling towers 10 and 36 respectively, including the curvature of the bottom end of fan cylinder 24 or fan cylinder 50. The same is true insofar as cutting of panels 26 longitudinally thereof to form elongated partial panels 26c for use as gap seals or the like.

Panels 26 used to construct the vertical walls 32 of tower 10 or the casing walls 52 of tower 36 are affixed to respective vertical support structures 34b or 58b in the same manner described with respect to installation of panels 26 making up deck 28 of tower 10 or deck 48 of tower 36.

FIGS. 5 and 6 illustrate the way in which panels 26 may be used of advantage to construct the horizontal hot water distribution deck 30 of distributor 16. In this instance, each of the panels 26 is provided with a series of staggered openings 118 in main section 60 of a diameter to receive respective nozzles 120. One spacing pattern is on 6 inch by 6 inch offset centers as depicted in FIG. 6. If required to accommodate nozzles 120, flanges 90 of each of the panels 26 may be provided with a cutout (not directly shown in the drawings) for clearing a respective nozzle 120. Two rows of nozzles 120 are mounted on each panel 26 across the width thereof.

In the case of nozzle spacings of 1 foot by 1 foot, as shown in FIGS. 7 and 8, one row of nozzles 120a is provided in each panel 26. The way in which panels 26 nest when joined in perpendicular relationship at a corner is also depicted in FIG. 7.

Figure 9:
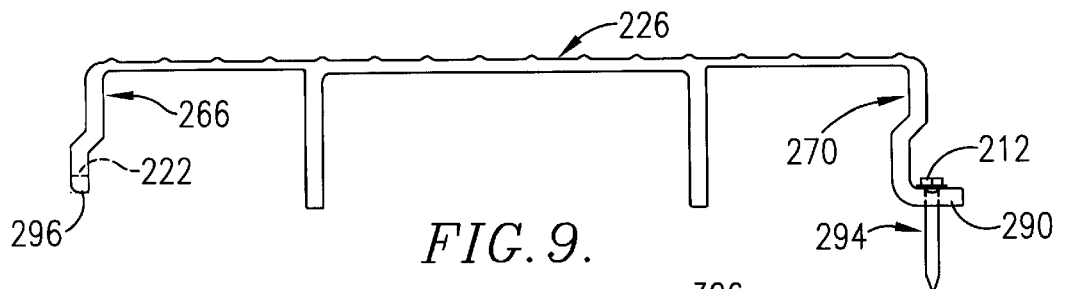
FIGS. 9 through 14 inclusive are respective enlarged essentially cross sectional representations of six alternate embodiments of multiple purpose panels of this invention.

In the alternate embodiment of the invention illustrated in FIG. 9, the panel 226 differs from panel 26 in that the flange 290 integral with end section 270 of the panel is not as wide as flange 90, and the end section 266 thereof is provided with a series of indentations 222 in the outermost edge 296 thereof for accommodating the head 212 of fastener 294. Otherwise, the panel 226 is fabricated the same as panel 26 insofar as component parts and relative sizes of those component parts are concerned.

Figure 10:
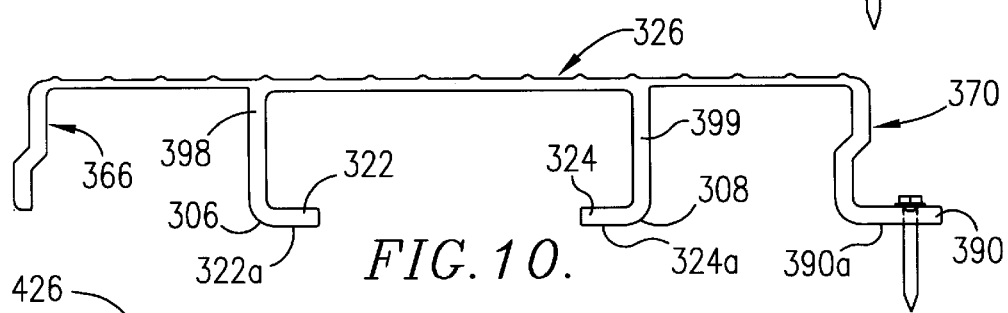

The panel 326 of the embodiment depicted in FIG. 10 differs from panel 26 in the provision of integral, in-turned lips 322 and 324 integral with the outer margins 306 and 308 of reinforcement web sections 398 and 399 between end sections 366 and 370. The outer surfaces 322a and 324a of lips 322 and 324 respectively lie in the same plane as the outer surface 390a of flange 390 on end section 370 of panel 326. The lips 322 and 324 provided additional bearing surface for reinforcement web sections 398 and 399, and also increase the structural rigidity thereof.

Figure 11:
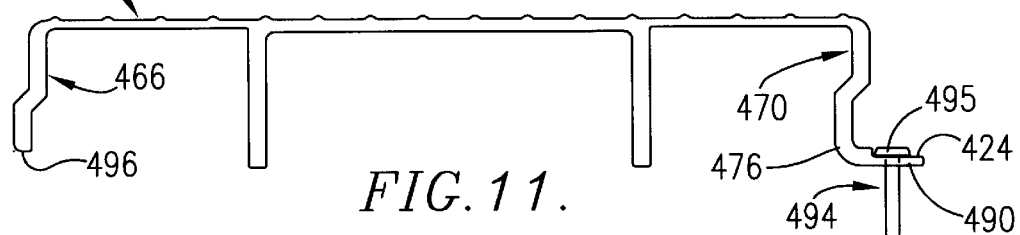

The alternate embodiment of panel 26 depicted in FIG. 11 and designated 426 is different from panel 26 only in the provision of a recess 424 in the upper face of flange 490 on end section 470 of a depth generally equal to the height of the head 495 of fastener 494. In this instance, the width of the end section 466 is essentially the same as the width of end section 66 of panel 26, in that the outer margin 496 of section 466 rests on the non-recessed part of flange 490 adjacent L-shaped leg 476 of end section 470.

Figure 12:
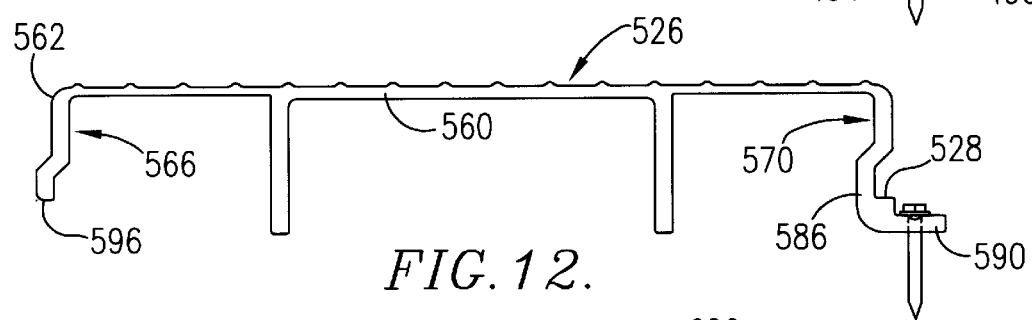

Another alternate embodiment of panel 26 as depicted in FIG. 12 and designated by the numeral 526 is similar to the embodiment 426 shown in FIG. 11, except that structure 528 defining a shoulder is provided at the zone of juncture of flange 590 with outer leg portion 586 of end section 570. The opposite end section 566 of panel 526 is therefore of an effective transverse width, i.e., the distance between margin 562 of main panel section 560 of panel 526, and the outermost edge 596 thereof, is such that the edge 596 of an adjacent panel 526 will rest on and be directly supported by shoulder 528. The interlocking construction of end sections 566 and 570 of adjacent side-by-side panels 526 remains as previously described.

Figure 13:
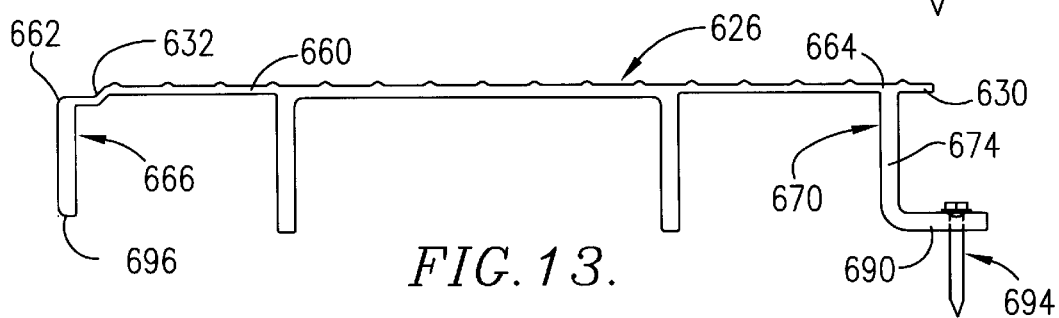

The alternate embodiment 626 of the present invention as shown in FIG. 13 has an L-shaped end section 670 provided with a relatively straight leg portion 674 which has an out-turned flange 690 thereon which is perpendicular to leg portion 674. Flange 690 is adapted to receive a series of longitudinally spaced fasteners 694 as shown in FIG. 13. The opposite end section 666 is also of transversely straight configuration and the edge 696 thereof is located in spaced relationship from main section 660 a distance such that edge 696 of an end section 666 rest directly on the upper surface of flange 690 of an adjacent side-by-side panel 626.

Panel 626 has an extension 630 integral with margin 664 of main panel section 660 which projects outwardly beyond leg portion 674 of end section 670 in overlying relationship to flange 690. Extension 630 is parallel with main section 660.

The margin 662 of main panel section 660 which is opposite extension 630 has a depression or recess 632 therein of a depth and width to accommodate the extension 630 of an adjacent panel 626. The extension 630 of each panel 626, in association with the depression or recess 632 provides the interlocking feature between adjacent panels 626 that is offered by the end sections 66 and 70 of panels 26. This results from the fact that end section 666 of a panel 626 is trapped between extension 630 and flange 690 of the end section 670 of an adjacent side-by-side panel 626.

Figure 14:
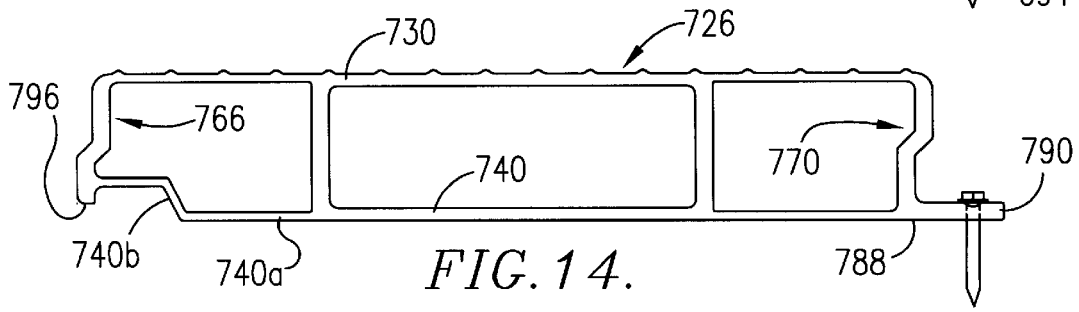

The alternate panel embodiment designated by the numeral 726 and illustrated in FIG. 14, differs from panel 26 in the provision of a secondary main panel section 740 which extends across the bottom of the panel in spaced, parallel relationship to the main panel section 730. Secondary panel section 740 is integral with the outermost edge 788 of end section 770, and with end section 766. It is to be seen that the segment 740a of secondary panel section 740 has a recessed portion 740b for accommodating the flange 790 of an adjacent side-by-side panel section 726. Again though, the outermost extremity 796 of end section 766 rests on and is supported by the upper surface of 790 and end sections 766 and 770 are configured so that adjacent end sections complementally interfit and interlock in the same manner that sections 66 and 70 of side-by-side panels 26 interfit and interlock.

The manner in which panels 26 are affixed to structural components of the tower are important to the integrity of the decks and casing walls formed thereby. Load resistance in the plane of the panels is resisted by direct shear on respective fasteners. This is a significant improvement over prior attachments which penetrate through the outer panel member in significant spaced relationship from the structural support, as in the Bedford interlocking deckboard, in that the Bedford fasteners are subjected, to substantial bending in addition to shear forces.

The use of shorter fasteners 94 also significantly speeds installation. The shorter, self-drilling, self-tapping screws 94 are more stable during installation and easier to handle. Long screws are difficult to keep from wobbling while maintaining a drilling force.

Installation of the panels 26 is accomplished from the exterior surface sides of the panels and decks may be installed from the top. Access underneath the deck or from inside of the tower is not required to fasten the panels to the framing or to effect an interlock between the panels. No fastener heads are exposed on the exterior surface of the panel to serve as a tripping hazard. Hidden fasteners also present a more aesthetic appearance.

The attachment flange 90 of panel 26 increases the stiffness of the panel 26 and reduces deflection between adjacent side-by-side panels. The center of gravity is shifted toward the flange 90 thus increasing the section modulus at the attachment flange. When slots or openings 92 are provided in flange 90, they serve as fastener locators to facilitate installation of the panels.

The two intermediate reinforcing web sections 98 and 100 serve to stiffen the main panel section 60 of panel 26 and create transverse spans 60a, 60b and 60c. In order to facilitate placement of glass fiber reinforcement mats in the panel 26 during the pultrusion thereof, the two outboard panel spans 60a and 60b are preferably thinner in cross sectional thickness than the innermost span 60c, as previously explained.

Layers of glass reinforcement mat may be placed across what will become the outer part of end section 66, the entire width of main section 60, down what becomes the outer part of end extension 70, and the upper part of flange 90. Additional layers of glass reinforcement matting may also be placed such that the reinforcement matting will be adjacent to what will become the underface 102 of spans 60a, 60b and 60c of main section 60 of panel 26. This additional innermost glass fiber reinforcing matting also extends continuously along what will become the innermost face of end section 66, and the innermost face of end section 78 of panel 26. Finally, that innermost glass fiber reinforcing matting layer will also extend through the lowermost part of flange 90 adjacent face 104 thereof.

Where panel 26 is of a width to have reinforcing web sections such as 98 and/or 100, the fiber glass matting is incorporated in the web sections in the form of a transversely inverted U-shape reinforcement that is adjacent the outermost faces of each web section 98 and/or 100 and also directly underlies the reinforcement matting extending across the width of main section 60 proximal to the underface 102 thereof.

The result is an outboard clear span width for spans 60a and 60b of 2.875 inches each for a 12 inch wide panel 26, and an interior span width 60c of 5.25 inches.

The ribs 110 which project outwardly from the surface 68 of main section 60 of panel 26 restrict the contact area between the worker's shoe soles and the surface of the panel. This small contact area insures a high contact pressure which squeezes the water off of the ribs 110. Also, elevating the shoe sole above surface 68 by ribs 110 provides a natural passageway for displaced water to escape from under the shoe sole. As a consequence, there is a reduction in the tendency of water that collects on the top of a deck to act as a lubricant for shoe slippage. Application of a grit finish as a secondary post process is thereby avoided.

What is claimed is:

1. A synthetic resin multiple purpose panel of construction such that when a series of the panels are mounted in side-by-side relationship on supporting structure, they will form a deck or wall thereof, said panel comprising:

an elongated panel main section of synthetic resin material and provided with a longitudinally extending outer surface defining face, and an opposed, longitudinally extending normally innermost surface, said main panel section having opposed longitudinally extending side margins; and elongated end sections of synthetic resin material integrally connected to the main panel section longitudinally thereof on opposite sides of the main panel section in proximal relationship to corresponding side margins of the main panel section, said end sections extending from the main panel section in a direction away from the outer surface defining face of the main panel section, each of said end sections being of generally non-linear configuration transversely thereof and provided with an inner leg presenting a first leg portion integral with and extending away from the main panel section and an L-shaped leg integral with a respective first leg portion, said L-shaped legs each having an outer leg portion generally parallel transversely thereof with said first leg portion, spaced from a corresponding first leg portion, and having an outermost elongated margin, said L-shaped legs further being provided with an intermediate leg portion joining a respective outer leg portion to a corresponding first leg portion, each of said intermediate leg portions being at an angle transversely thereof with respect to the transverse axes of the first leg portion and the outer leg portion joined thereto to cause the outer leg portions of the end sections to both be offset from corresponding first leg portions in the same direction, the angle of said intermediate leg portion of each L-shaped leg being within the range of about 30° to at least slightly less than about 90° with respect to a corresponding first leg portion, said outer leg portions of each L-shaped leg being offset from the first leg portion to which a respective L-shaped leg is joined, a distance no greater than about three times the thickness of the corresponding first leg portion of an end section, one of the end sections being provided with elongated out-turned flange means generally parallel to the main panel section and extending in a direction away from the other end section, said other end section being of a transverse width to cause said outermost margin of the outer leg portion thereof to directly rest on and be supported by the flange means of said one end section of an adjacent panel when the panels are mounted in side-by-side relationship on said underlying supporting structure, and the leg portions of said end sections collectively being of a transverse width and configured to cause the end sections of adjacent panels mounted in side-by-side relationship to complementally engage and interlock to prevent movement between proximal end sections in a direction away from the supporting structure for the panels to thereby maintain adjacent main panel sections in generally parallel relationship when loads are imposed on the outer surfaces of the panels in a direction essentially normal thereto.

2. A multiple purpose panel as set forth in claim 1, wherein said intermediate leg portions of said one and said other end sections are each at an angle of about 45° with respect to corresponding first and outer leg portions of respective end sections.

3. A multiple purpose panel as set forth in claim 1, wherein said sections of the panel are of the same cross sectional configuration throughout the length of the panel to permit pultrusion manufacture thereof.

4. A multiple purpose panel as set forth in claim 1, wherein is provided an elongated web section of synthetic resin material integrally joined to the main panel section longitudinally thereof between said end sections and projecting from the main section in the same direction as said end sections, said web section having an outermost edge remote from the main panel section, said web section providing support for the main panel section longitudinally thereof.

5. A multiple purpose panel as set forth in claim 4, wherein said web section is provided with an out-turned reinforcement lip integral with said outermost edge thereof.

6. A multiple purpose panel as set forth in claim 4, wherein said panel is provided with at least two web sections located in spaced relationship transversely of the main panel section.

7. A multiple purpose panel as set forth in claim 6, wherein each of said web sections is provided with an out-turned reinforcement lip integral with the outermost edge thereof.

8. A multiple purpose panel as set forth in claim 1, wherein said flange means of said one end section of each panel has an elongated, outwardly projecting shoulder, the other end section of each panel being of a length to rest on the shoulder of an adjacent side-by-side panel.

9. A multiple purpose panel as set forth in claim 1, wherein it is provided a plurality of spaced fastening means extending through the flange means of said one end section of each side-by-side panel and adapted to be received in said supporting structure of the tower for affixing respective panels to the tower.

10. A multiple purpose panel as set forth in claim 9, wherein each of said fastening means is a self-tapping threaded member having a head for engaging a respective out-turned flange means of said one end section.

11. A multiple purpose panel as set forth in claim 10, wherein the out-turned flange means of said one end section of each panel is provided with a series of recesses therein, said fastening means each including a head and a shank, each recess being configured to generally complementally receive the head of a respective fastening means.

12. A multiple purpose panel as set forth in claim 1, wherein is provided fastening means extending through said extension and the out-turned flange means of each panel for affixing respective side-by-side panels to the supporting structure of the tower.

13. A multiple purpose panel as set forth in claim 1, wherein said outer surface of the main panel section is provided with integral longitudinally extending raised ribs thereon to increase the slip resistance of said outer surface.

14. A multiple purpose panel as set forth in claim 1, wherein is provided a secondary panel section essentially parallel to said main panel section, and joined to the web section and said end sections in spaced relationship from the main panel section.

15. A multiple purpose panel as set forth in claim 14, wherein said secondary panel is provided with an inset adjacent said other section thereof for clearing the flange means of said one section of an adjacent panel when the panels are in side-by-side relationship on the supporting structure.

16. A synthetic resin multiple purpose panel of construction such that when a series of the panels are mounted in side-by-side relationship on supporting structure, they will form a deck or wall thereof, said panel comprising:

an elongated, generally planar main panel section of synthetic resin material and having opposed longitudinally extending side margins; and elongated end sections of synthetic resin material integrally connected to the main panel section in proximal relationship to corresponding side margins thereof, each of said end sections having a main leg portion extending in one direction in generally perpendicular relationship to the main panel section, the main leg portion of one of the end sections being provided with elongated out-turned flange means on the outer margin thereof and located in generally parallel relationship to the main panel section and extending in a direction away from the other end section, the main leg portion of said other end section of each panel lying in side-by-side, parallel relationship to the main leg portion of said one end section of an adjacent side-by-side panel, the main leg portion of said other end section of each panel being of a dimension in a direction perpendicular to the main section to rest directly on and be supported by the flange means of an adjacent panel, said main section of each panel being provided with an extension adjacent said one end section thereof in generally parallel relationship to said main panel section, and recess means in said main section of each panel configured to receive the extension of an adjacent side-by-side panel to effect and interlock therebetween.

* * * * *